United States Patent [19]

Brister

[11] 4,370,862
[45] Feb. 1, 1983

[54] APPARATUS AND METHOD FOR FREEZING A SLUG OF LIQUID IN A SECTION OF A LARGE DIAMETER FLUID TRANSMISSION LINE

[75] Inventor: Beryle D. Brister, Amarillo, Tex.

[73] Assignee: Brister Incorporated, Amarillo, Tex.

[21] Appl. No.: 831,052

[22] Filed: Sep. 6, 1977

Related U.S. Application Data

[62] Division of Ser. No. 722,665, Sep. 13, 1976, Pat. No. 4,112,706.

[51] Int. Cl.$^3$ .............................................. F25C 1/00
[52] U.S. Cl. ....................................... 62/66; 62/135; 62/293; 165/109 R; 138/97
[58] Field of Search .................... 62/66, 135, 64, 293, 62/514 R; 138/97; 165/DIG. 11, DIG. 14, 109

[56] References Cited

U.S. PATENT DOCUMENTS

| | | | |
|---|---|---|---|
| 2,257,727 | 10/1941 | Bennett et al. | 62/463 X |
| 2,483,082 | 9/1949 | Young et al. | 62/293 X |
| 3,041,850 | 7/1962 | Nunn | 138/97 X |
| 3,283,526 | 11/1966 | LeBoeuf | 62/135 |
| 3,623,337 | 11/1971 | Tremont | 62/293 |
| 3,695,301 | 10/1972 | Pittman | 62/293 X |
| 3,827,282 | 8/1974 | Brister | 73/40.5 R |
| 3,926,006 | 12/1975 | Brooks et al. | 62/293 X |

Primary Examiner—William E. Tapolcai
Attorney, Agent, or Firm—Hubbard, Thurman, Turner & Tucker

[57] ABSTRACT

Method for freezing a slug of water to form an ice plug in a section of a pipeline for hydrostatic testing purposes. The ice plug is formed by transferring thermal energy from the slug of water through the walls of the pipeline to a cryogenic cooling fluid such as liquid nitrogen. A section of the pipeline is filled with water and is enclosed by an insulated chamber. The chamber is filled with liquid nitrogen to form a pool around the pipeline. The liquid nitrogen is agitated by discharging a stream of nitrogen vapor through the pool. Heat exchange occurs as a result of heat transfer directly from the surface of the pipeline to the liquid nitrogen by the action of convection currents produced by the vigorous agitation of the liquid associated with the motion of the nitrogen vapor. In a preferred embodiment, the liquid nitrogen is diffused over the surface of the pipeline by means of a permeable layer of material which is easily wetted by the liquid nitrogen.

10 Claims, 6 Drawing Figures

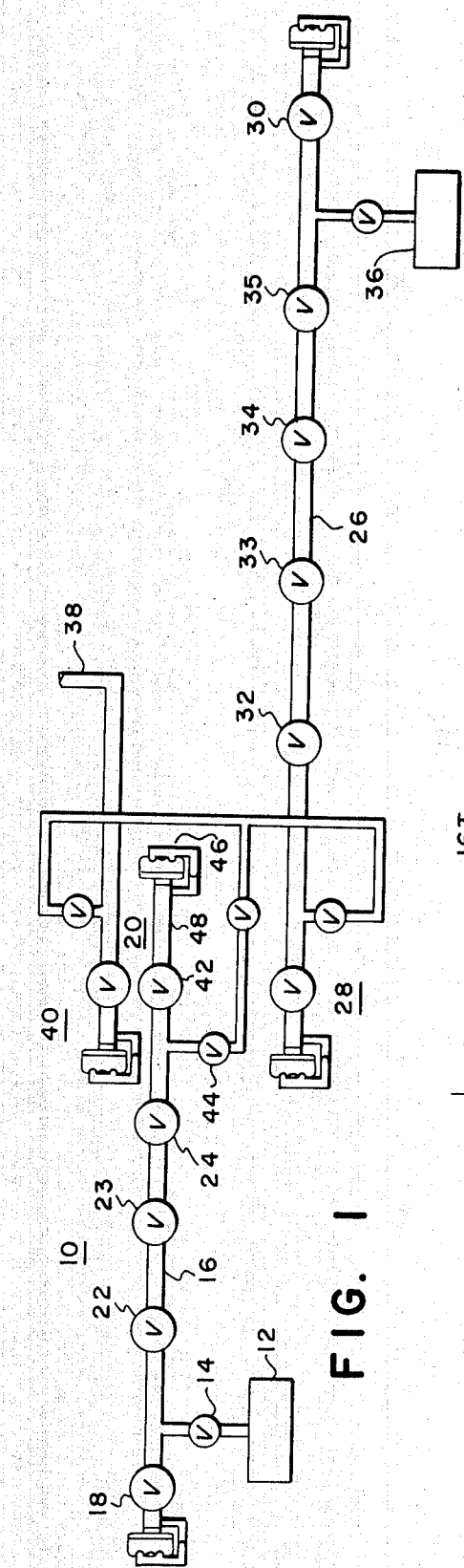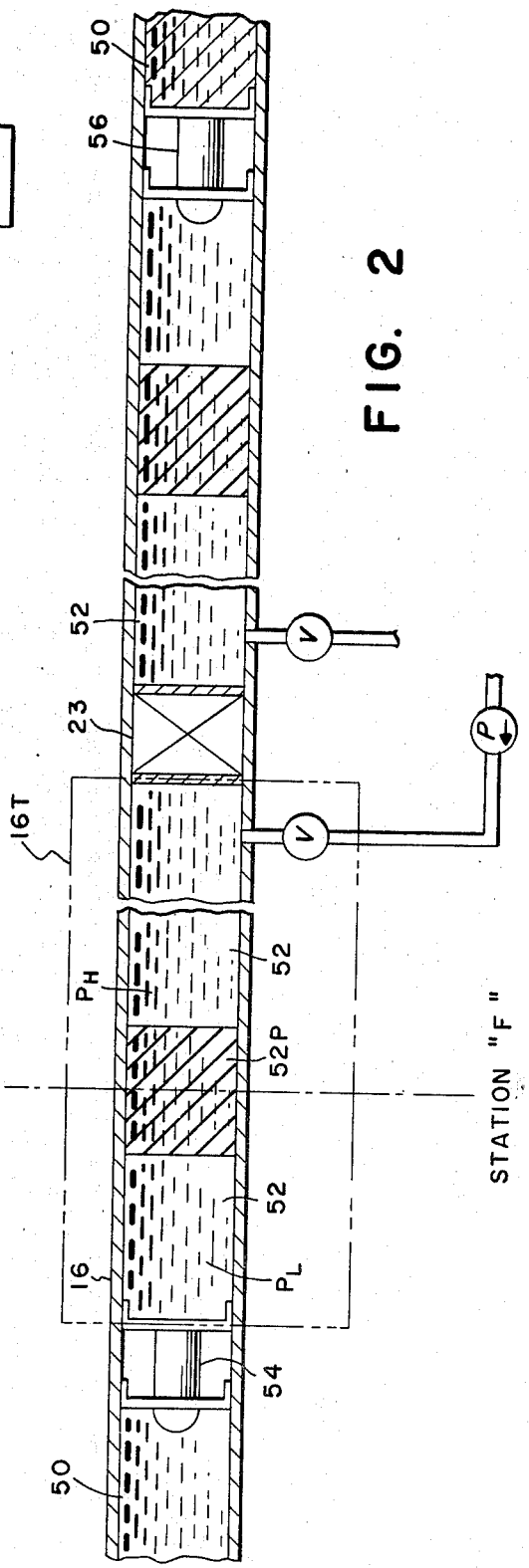

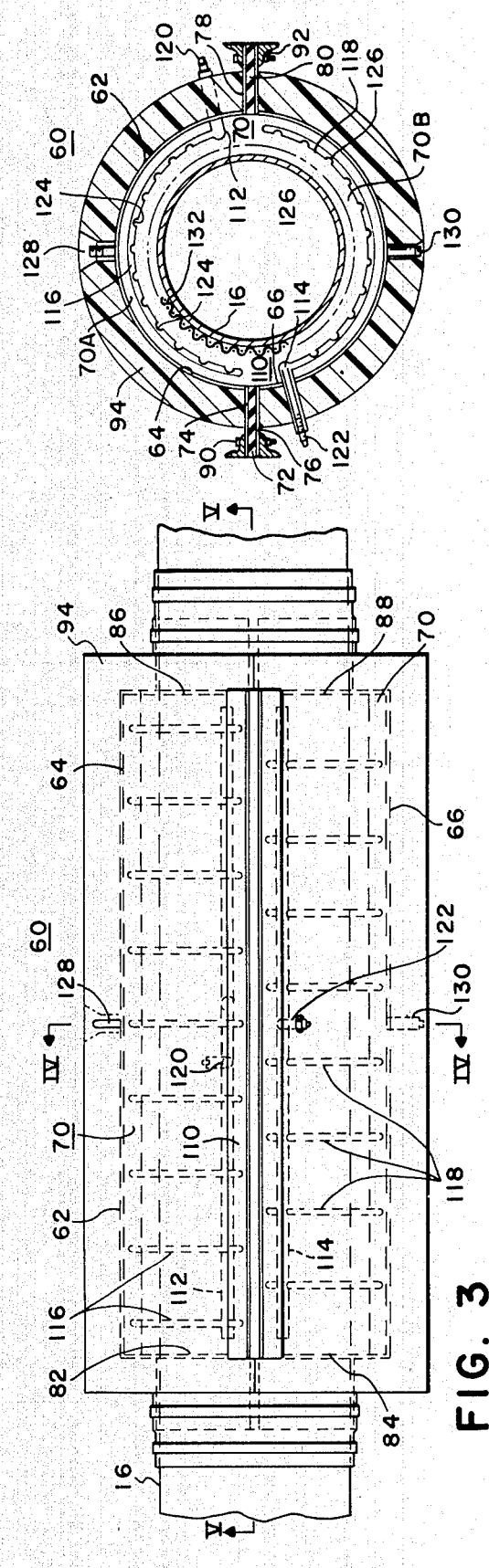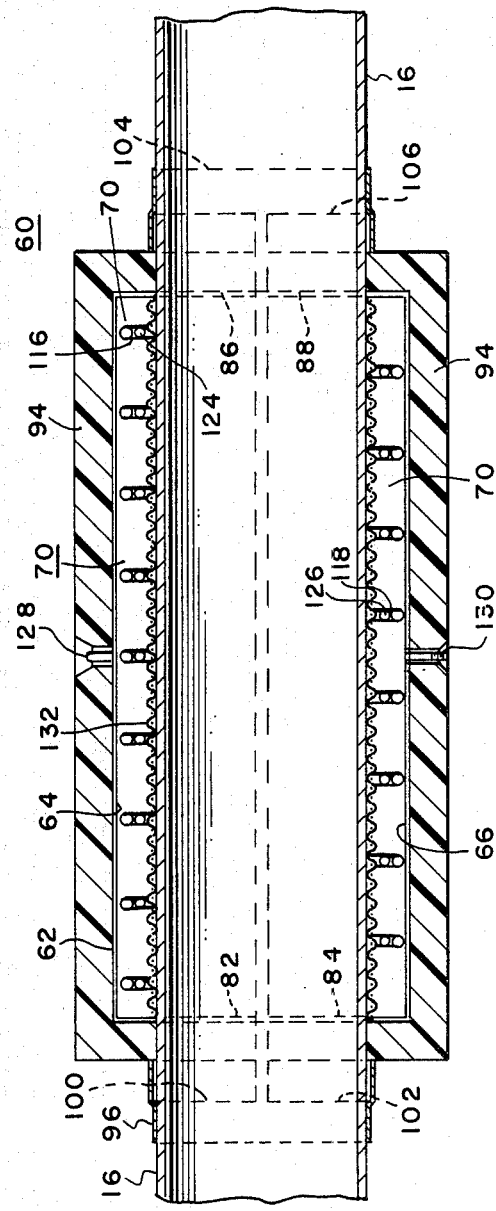

APPARATUS AND METHOD FOR FREEZING A SLUG OF LIQUID IN A SECTION OF A LARGE DIAMETER FLUID TRANSMISSION LINE

This is a divisional of application Ser. No. 722,665, filed Sept. 13, 1976 now U.S. Pat. No. 4,112,706.

BACKGROUND OF THE INVENTION

1. Field of the Invention

The present invention relates generally to the installation, maintenance, and testing of fluid transmission lines, and in particular, to methods for freezing a slug of water in a large diameter, high-pressure pipeline for hydrostatic testing and repair or modification purposes.

2. Description of the Prior Art

Large diameter pipelines have been used for many years to transport crude oil, natural gas, gasoline, jet fuel and other petrochemical products over great distances. These pipeline systems gather the petroleum products from the field and transport them to refineries and processing plants. The finished products from the refineries and processing plants are then transported over long distances to market.

These pipelines must be operated at high pressures in order to economically transmit large volumes of fluid. The high operating pressures represent a significant percentage of the maximum pressure which the pipe will withstand before rupture or leak, even if in perfect condition. Because of the nature of the petroleum products, rupture of a pipeline, or even relatively small leaks, can seriously damage the ecology and endanger human life. New pipelines may leak or rupture for a number of reasons, including faulty manufacture of the pipe, faulty weld joints, or damage to the pipe during transportation or installation. Pipelines which have been in use for some period of time are also subject to leak or rupture due to corrosion.

Because of the serious consequences and relatively high likelihood of ruptures and leaks, rigorous hydrostatic testing is employed to insure the integrity of each new pipeline installation. These hydrostatic testing procedures are exceedingly expensive and represent a very large proportion of the total cost of laying the pipeline. The hydrostatic testing of existing pipelines is even more expensive because the pipeline must be taken out of service for a substantial period of time.

Because of the substantial expense involved, methods for installing and testing new pipelines, or for testing, repairing or modifying existing pipelines are continuously being improved. One such improved method is disclosed in U.S. Pat. No. 3,827,282 issued to B. D. Brister. According to that disclosure, a large diameter pipeline designed to transport fluid products over great distances at high pressures can be tested at pressures equal to the minimum rated yield strength of the pipe by filling a test section of the line with water, freezing a slug of the water by the external application of very low temperatures to form an ice plug within the section, then raising the pressure of the water against the frozen water to the test pressure, while also sustaining the ice plug, and monitoring a lower pressure on the back side of the ice plug to detect a faulty ice plug. A combination of pressure cylinders and chill coils filled with a cryogenic cooling fluid such as liquid nitrogen are utilized to form the ice plug by conduction transfer of thermal energy from the slug of water in the test section through the walls of the pipeline and through the walls of the pressure cylinders and the chill coils. There remains considerable interest in the general improvement of the methods and apparatus which utilize a cryogenic cooling fluid to form the ice plug. In particular, because of increased labor costs and loss of product revenue associated with downtime, a further reduction in the length of time required to establish an ice plug is desired.

SUMMARY OF THE INVENTION

It is an object of the present invention to provide an efficient method for freezing a slug of liquid in a section of a fluid transmission line by the efficient application of a cryogenic cooling fluid to exterior surface portions of the transmission line in such a manner that an ice plug is formed quickly and is easily sustained during hydrostatic testing, repair or modification purposes without altering the physical characteristics of the transmission line.

According to one aspect of the present disclosure, the invention may be practiced in combination with a fluid transmission line such as a large diameter pipeline for transporting fluid hydrocarbon products over substantial distances at high pressures. In accordance with known hydrostatic testing procedures, such a pipeline system can be tested at pressures equal to the minimum rated yield strength of the pipe by filling a test section of the pipeline with water, and freezing a short length of the water by the external application of very low temperatures to form an ice plug therein.

According to novel features of the present invention, the test section of the pipeline is thermally isolated from the surrounding environment by means of a detachable envelope having side portions which circumscribe the test section, and end portions which engage the pipeline. The side and end portions define an annular chamber when assembled around the pipeline. A manifold is disposed within the chamber for distributing the flow of a cryogenic cooling fluid such as liquid nitrogen uniformly throughout the chamber. The manifold includes a number of conduit portions which are arranged to discharge a stream of the cryogenic cooling fluid directly into the chamber and onto the surface of the pipeline. Heat is transferred from the slug of water within the pipeline by means of convection to the pipeline, by conduction through the pipeline, and by convection from the pipeline to the surrounding pool of liquid cryogenic cooling fluid. Heat exchange from the surface of the pipeline to the surrounding cryogenic cooling fluid occurs as a result of heat transfer directly from the surface of the pipeline to the surrounding liquid by the action of convection currents. The convection currents are established by agitating the pool of liquid cryogenic cooling fluid which surrounds the pipeline within the chamber. In one aspect of the invention, agitation of the pool of cryogenic cooling fluid is accomplished by discharging a stream of vaporized cryogenic cooling fluid through the surrounding pool. The convection currents result from the vigorous agitation of the liquid by the motion of the vapor as it is discharged through the pool. The overall exchange of heat is related to the volume of bubbles of vapor discharged into the pool, the frequency of their release, and how well the cooling fluid wets the heating surface of the pipeline.

According to another aspect of the present invention, the heat transfer process is enhanced by diffusing means which is operably disposed in surface-to-surface engagement with the pipeline to uniformly distribute the liquid cooling fluid over the surface of the pipeline.

The novel features which characterize the invention are defined by the appended claims. The foregoing and other objects, advantages and features of the invention will hereinafter appear, and for purposes of illustration of the invention, but not of limitation, an exemplary embodiment of the invention is shown in the appended drawing.

BRIEF DESCRIPTION OF THE DRAWING

FIG. 1 is a schematic diagram of a typical pipeline system;

FIG. 2 is a simplified elevational view of a test section of the pipeline shown in FIG. 1;

FIG. 3 is a simplified elevational view of a cryogenic envelope assembled about the test section of the pipeline illustrated in FIG. 2;

FIG. 4 is a side elevational view, partly in section, taken along the line IV—IV;

FIG. 5 is an elevational view of the apparatus shown in FIG. 3 taken substantially along the line V—V; and, FIG. 6 schematically represents the overall method and apparatus of the present invention.

DESCRIPTION OF THE PREFERRED EMBODIMENT

Figure 6:
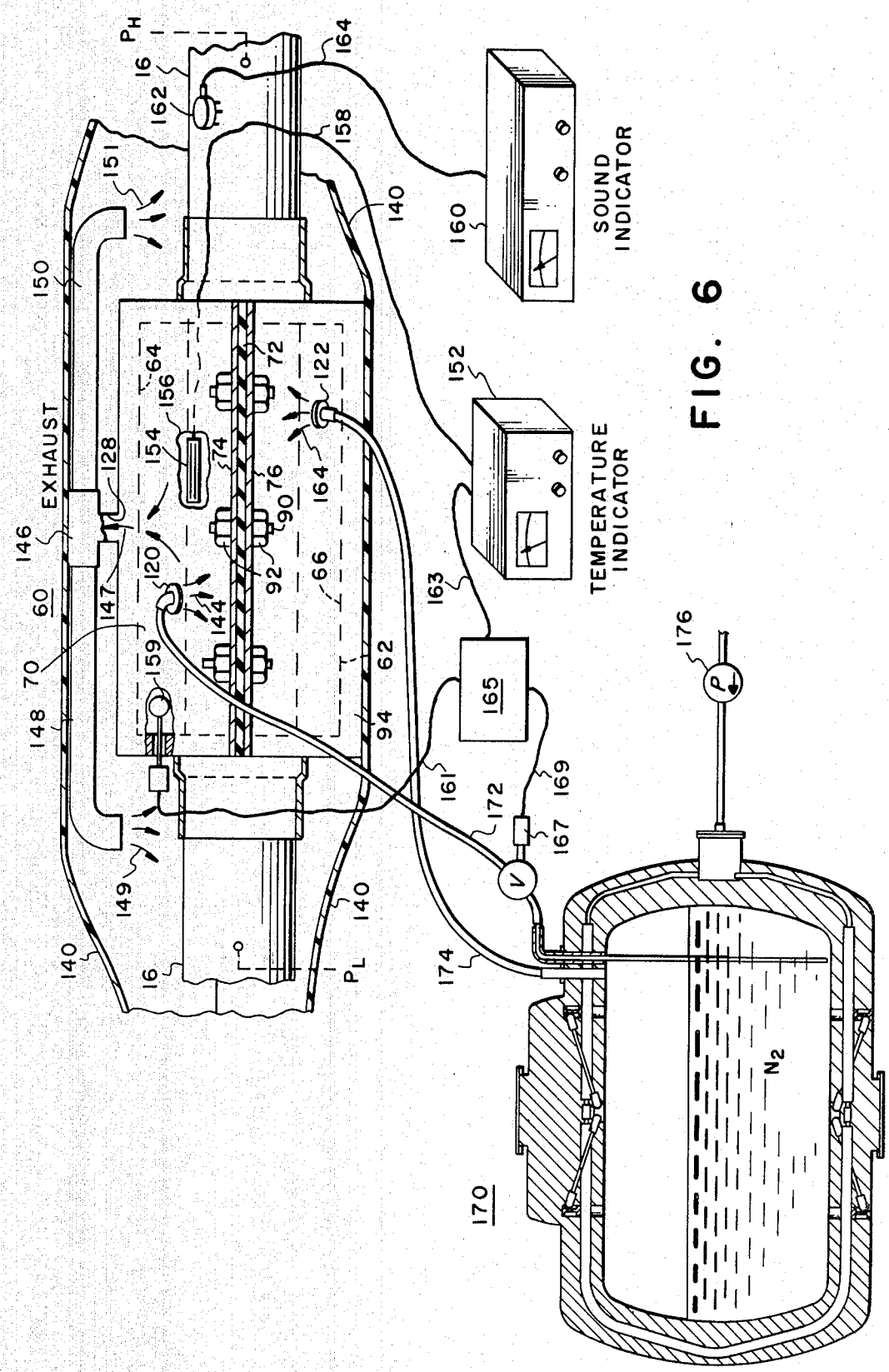

Referring now to the drawing, a simplified pipeline system is indicated generally by the reference numeral 10 in FIG. 1. The pipeline system 10 includes an originating station 12 for pumping fluid products, typically crude oil, natural gas, or refined petroleum products such as gasoline, jet fuel or the like, into the pipeline. Fluids from the pump station 12 are passed through a valve 14 to a section of the pipeline 16 having launcher-receivers 18 and 20, and mainline valves 22, 23 and 24. A second section of pipeline 26 has launcher-receivers 28 and 30 at each end and mainline valves 32-35. A receiving station represented at 36 may be another pump station, a refinery, a distribution terminal, or the like. A branch line 38 terminates in a launcher-receiver 40. The pipeline 16 may be up to 60 inches in diameter and of welded construction. Additional launcher-receivers may be located along the lines 16 and 38 as needed.

The three launcher-receivers 20, 28 and 40 may be interconnected to either launch or receive batch pigs. The launcher-receivers 20 and 40 will typically be used to receive pigs. Launcher-receive 28 will typically be used to launch a pig. A pig may be launched from the launcher-receiver 28 by closing valves 42 and 44, opening the end closure means 46 and inserting the pig into the throat of the tube 48.

The gathering system 10 of FIG. 1 may be several hundred miles in length. For example, line section 16 may be eight inches in diameter and may start at an oil field in New Mexico. The line 38 may come from an oil field in West Texas and may also be eight inches in diameter. The line 26 may be ten or twelve inches in diameter, and may extend several hundred miles across the state of Texas to a refinery on the Gulf coast. The principle product carried by the system 10 may be crude oil. The normal operating pressures of the system might be as high as 700 or 1500 PSI.

A suitable method for hydrostatically testing the system 10 is disclosed and claimed in U.S. Pat. No. 3,827,282 issued to B. D. Brister, Aug. 6, 1974. Referring now to FIG. 2, in accordance with the general method disclosed by U.S. Pat. No. 3,827,282, hydrostatic testing of a pipeline 16 which is in service, that is, carrying a fluid product 50 which may be for example, crude oil, is initiated by displacing the product 50 with water 52 by means of a standard batch pig 54 which may be launched from any convenient launcher receiver, for example, launcher receiver 20 behind the fluid product 50 using the water 52 as the propelling fluid. A second batch pig 56 is launched behind the water 52 and ahead of the product 50. An adequate amount of the water 52 is injected into the line 16 to fill the section 16T which is to be tested. Next, a short length or slug 52P of the water in the line 16 is frozen to form an ice plug at a predetermined position (e.g., Station "F") along the line 16.

The ice plug 52P may be frozen using the apparatus indicated generally by the reference numeral 60 in FIGS. 3, 4 and 5. The apparatus 60 comprises an envelope or box, indicated generally by the reference numeral 62, having generally cylindrical halves or shells 64 and 66 which are assembled around the pipe 16 to define an annular chamber 70 having upper and lower chamber regions for storing the liquid cooling fluid. Any suitable fluid sealing means 72 may be used along the seam between the halves 64 and 66 to seal the chamber 70. The sealing material 72 is disposed intermediate of longitudinally extending flange portions 74, 76 and 78, 80 of each half section 64 and 66 respectively. The half sections 64,66 also include radially extending flange portions 82, 84 and 86, 88 which are engaged with the outer periphery of the pipeline 16. The side portions 64–66 and end portions 82–88 when assembled around the pipeline 16 define the annular chamber 70. The inner face of the sealing means 72 and the longitudinal flanges 74–80 are secured together by any suitable means, for example, a bolt 90 and nut 92.

A layer 94 of insulation is disposed on the outer surface of the half shells 64 and 66. The insulation preferably comprises polyurethane foam which is bonded to the outer surface of the cylindrical half shells. However, other foams having good thermal insulation properties such as polystyrene, rubber, and silicones may also be used.

The radially extending end flange portions 82–88 preferably include longitudinally flared portions 100–106 on either end of the envelope 62 to complete the fluid-tight seal around the pipe 16. The flared portions 100–106 may be secured to the pipe 16 in a compression union by means of metal bands (not shown).

A manifold, indicated generally at 110, is disposed within the chamber 70 for distributing the flow of the cryogenic cooling fluid substantially uniformly throughout the chamber. In the preferred arrangement described herein, the manifold 110 comprises an upper half 112 and a lower half 114 which correspond respectively with the upper shell portion 64 and the lower shell portion 66 of the envelope 62. Each manifold 112, 114 is a straight tubular member having a number of openings to which a plurality of distribution conduit members 116 and 118 are joined in fluid communication. Each manifold 112 and 114 is secured in fluid communication with an intake port 120 and 122 for admitting the flow of cryogenic cooling fluid into the chamber 70. As seen in FIG. 4 of the drawing, the intake ports 120 and 122 project radially through the walls 64 and 66 of the envelope 62 and also through the insulation layer 94. The conduit members 116 and 118 are seen to be generally curved members which conform generally with the curvature of the centrally disposed pipeline 16. Each distribution conduit includes a number of openings, or discharge ports 124 and 126 corresponding respectively to the upper and lower halves of the chamber 70. The openings 124, 126 are arranged to discharge cooling fluid directly into the chamber and onto the surface of the pipeline 16, and preferably in a direction substantially at a right angle with respect to the surface of the pipeline 16. Because the manifolds 112 and 114 are not connected in fluid communication with one another, it is possible to discharge cooling fluid of differing qualities and flow rates in the two principle regions of the chamber 70 which are required to implement the method of the present invention as will be discussed in detail hereinafter. During the exchange of heat from the slug of water within the pipeline 16 to the surrounding cooling fluid within the chamber 70, large volumes of liquid cooling fluid will evaporate and form vapor. This vapor is exhausted from the chamber 70 by means of an exhaust port 128 which projects through the envelope wall 64 and also through the surrounding insulation 94. The vapor may be exhausted into the surrounding atmosphere; however, it is preferably exhausted beyond the end portions of the envelope walls 64, 66 to chill the outer surface of the exposed and uninsulated pipeline.

In operation, the apparatus 60 provides a fluid-tight, thermally insulated chamber into which a cooling fluid such as liquid nitrogen is discharged until at least a portion of the enclosed transmission line 16 is submerged in a pool of the liquid cooling fluid. The principal means by which heat is transferred from the surface of the pipe 16 to the surrounding pool of cooling fluid is by convective heat transfer in which relatively hot and cold portions of the surrounding fluid are mixed when the fluid is placed in motion. Most of the heat exchange occurs as a result of transfer directly from the surface of the pipe 16 to the surrounding liquid by the action of convection currents. Convection currents are established according to the teachings of the present invention by discharging a stream of vaporized cooling fluid through the intake port 122 so that it is discharged into the chamber 70 and "bubbles" through the surrounding annular pool of liquid cooling fluid. The convection currents result from the vigorous agitation of the liquid by the motion of the vapor bubbles. The overall exchange of heat is related to the volume of the bubbles, the frequency of their release, and whether or not the cooling fluid "wets" the surface of the pipe 16.

For rapid heat transfer, the entire surface of the enclosed pipe 16 should be constantly wetted and saturated with the liquid cooling fluid. This effect is achieved in part by the discharge of streams of liquid cooling fluid from the openings 124 and 126 of the conduit members 116 and 118. It has been determined, however, that the distribution of cooling fluid over the surface of the pipe 16 is greatly enhanced by the provision of a layer 132 of a permeable material for diffusing the streams of liquid cooling fluid which are discharged onto the pipeline 16. The permeable material preferably comprises a material which is readily wetted by the cooling fluid. In a preferred arrangement, the layer 132 of permeable material is a sleeve of woven material such as a screen wire mesh. However, a suitable diffusing means may comprises a perforated metal webb or alternatively a wick matrix of stainless steel or glass fibers. Other suitable materials which have permeable properties may be used to good advantage. Best results have been obtained when utilizing the permeable materials described above disposed in surface-to-surface compressive engagement with the pipeline 16.

In using the apparatus 60 to freeze an ice plug, the pipeline 16 is uncovered at the point to be frozen only for a sufficient length to install the apparatus 60 around it. The pipeline 16 is filled with water which is preferably maintained in a static condition unless, of course, it is impossible to do so because of a leak in the line. The protective coating usually covering the pipeline 16 is preferably removed in the area where the envelope 62 is to be installed. After the envelope 62 has been bolted around the pipe, the entire apparatus 60 is covered with an insulated shroud or blanket 140 to increase the rate of heat transfer at the interface of the envelope 62 and pipeline 16 (see FIG. 6). After the test section of the pipeline has been enclosed by the thermally insulated chamber 70, liquid nitrogen, or some other suitable cryogenic cooling fluid, is discharged into the chamber 70 until at least a portion and preferably all of the enclosed pipeline 16 is submerged in a pool of the liquid nitrogen. Liquid nitrogen is discharged into the chamber 70, as indicated by the arrows 144, preferably until the chamber 70 is substantially filled by the liquid nitrogen. The flow of liquid nitrogen into the chamber 70 is terminated during a predetermined interval while the liquid nitrogen is evaporating in response to the transfer of heat from the enclosed pipeline 16, with the vapor being exhausted through the exhaust port 128 into a manifold 146, as indicated by arrows 147, where it is distributed by means of a pair of conduits 148 and 150 for discharge under the insulated blanket 140 which covers the end portions of the assembly 60, as indicated by arrows 149, 151. Additional liquid nitrogen is discharged into the chamber 70 as needed to replenish the evaporated cooling fluid.

The rate and frequency at which liquid nitrogen is discharged into the apparatus 60 may be determined by sensing the temperature of the surface of the enclosed pipeline 16 as the chamber 70 is filled. This function may be performed manually or automatically with a temperature indicator 152 which is responsive to temperature dependent changes within a temperature probe 154 which is disposed in surface-to-surface engagement with the enclosed pipeline 16 and which is suitably insulated from the surrounding pool of liquid nitrogen by means of an insulating layer 156. The probe 154 is electrically connected to the temperature indicator 152 by means of a bundle of conductors 158. Additional liquid nitrogen is discharged into the chambers 70 to replenish the evaporated nitrogen when the temperature of the pipeline 16 increases to a predetermined level above the temperature as indicated by the temperature indicator 152 when the chamber 70 is substantially full of liquid nitrogen.

For automatic control of the liquid nitrogen flow, a level controller 159 is disposed in the chamber 70. The level controller 159 may be a displacement transducer of conventional design which provides an electrical control signal 161 in response to displacement of the controller with respect to an arbitrary reference position. The level control signal 161 and a temperature control signal 163 form the input for a flow control unit 165. A flow control valve 167 is responsive to a flow control signal 169 from the control unit 165 to meter the quantity of liquid nitrogen required to maintain a prescribed liquid level in the chamber 70. The flow control signal 169 is responsive to a predetermined function of the liquid level control signal 161 and pipeline temperature control signal 163 to provide positive control of the level of liquid nitrogen in the chamber 70.

An important step in the hydrostatic testing and repair or modification procedure which utilizes an ice plug is the determination of the point in time after the freezing process has begun and when a suitable ice plug 52P has been formed within the test section 16T of the pipeline 16. A method for confirming the existence of an ice plug within the test section 16T is to sense the rate of formation of crystals within the slug of water as it freezes. This is carried out in the present invention by means of a sound indicator 160 which detects either the amplitude or the frequency of the noise generated within the freezing slug of water as crystals of ice expand and collide with one another as the slug freezes. An electrical signal proportional to the noise generated by the colliding ice crystals is generated by a transducer 162 which is disposed in contact with the outer surface of the pipeline 16 and is electrically connected to the sound indicator 160 by a bundle of conductors 164. It has been experimentally verified that during the process of freezing the slug of water within the test section 16T, the frequency and amplitude of the noise generated by the colliding ice crystals increases rapidly as the freezing process begins and then diminishes continuously and approaches a nominal level after the ice plug has been formed. Therefore an operator can utilize the temperature indications and the sound indications to determine at what rate the liquid nitrogen should be discharged into the chamber and at what point commencement of hydrostatic testing can begin with confidence that a complete ice plug has been formed.

An important method of the present invention is the step of agitating the liquid nitrogen which is formed in a pool around the pipeline 16. This is accomplished as discussed above by discharging a stream of nitrogen vapor through the pool of liquid nitrogen as indicated by the arrows 164 in FIG. 6. Agitation of the pool of liquid nitrogen which surrounds the enclosed section of pipeline may occur naturally due to the buoyant movement through the pool by bubbles of nitrogen vapor which are produced in response to heat transferred from the submerged portions of the pipeline to the surrounding liquid. However, stronger agitation may be desired during the early stages of the freezing process which may be accomplished quite easily by the discharge of nitrogen vapor through the inlet port 122.

Although it is generally desirable to form the ice plug as rapidly as possible, it may be desirable because of structural or material limitations associated with the metal comprising the pipeline 16 to precool the test section prior to the discharge of liquid nitrogen into the chamber 70 in order to avoid temperature shock. This may be accomplished by discharging nitrogen vapor into the chamber through the inlet port 120 for a predetermined period prior to the step of discharging liquid cooling fluid into the chamber so that the relatively warm surface of the pipeline (approximately 300° Kelvin) is decreased toward the relatively low temperature of boiling nitrogen (approximately 77° Kelvin).

Field experience and laboratory testing have confirmed that the properties of a pipe pressurized and frozen by the method and apparatus of the present invention are not altered in any way. In a recent test program, test specimens were removed from an unpressurized section, a pressurized section, and from a frozen section and were subjected to standard tension tests, impact tests, and metallographic examinations. The tension test data revealed only normal scatter at all three locations. The impact test data revealed no shift of transition temperature; the data from all tests fitted within a normal scatter band. The microstructures at all locations were found to be similar, consisting of laminar pearlite in a matrix of ferrite, with a low level of nonmetallic inclusions. No microfissures or any other unusual structural conditions were detected.

The freezing process can be greatly accelerated by diffusing the liquid nitrogen over at least a portion of the enclosed pipeline 16 and preferably uniformly over its entire enclosed surface. The liquid nitrogen may of course be diffused over the surface of the enclosed pipeline by simply directing a stream of the liquid nitrogen directly onto the surface of the pipeline. However, the liquid nitrogen is more uniformly and completely diffused over the surface by directing a stream of liquid nitrogen directly onto the surface of a permeable medium such as the woven screen 132 which is disposed directly on the enclosed surface area of the enclosed pipeline 16. In addition to its ability to diffuse the liquid nitrogen over the surface of the enclosed pipeline 16, the permeable medium 132 also operates to agitate the pool of liquid nitrogen which surrounds the enclosed pipeline by the buoyant movement through the pool of liquid nitrogen by bubbles of vaporized nitrogen which are produced in response to heat transferred from the submerged portions of the enclosed pipeline at irregularities in the surface of the permeable medium 132 disposed on the submerged portions of the transmission line.

Liquid nitrogen is the preferred cooling fluid for use with the apparatus as described herein. It is a safe refrigerant which is rather inactive chemically and is neither explosive nor toxic. Furthermore it is widely available commercially and is easily prepared by the fractionation of liquid air. A large volume of liquid nitrogen may be transported safely and easily in the field by means of a portable container 170 which is illustrated in FIG. 6. A liquid line 172 is connected in fluid communication with the liquid input port 120 and a vent line 174 is connected in fluid communication with the vapor input port 122 for discharge of vapor into the chamber 70. A pump 176 controls the rate of flow of liquid nitrogen and vapor through the liquid line 172 and vent line 174.

Once it is believed that a plug has been frozen, taking into account the temperature indications from indicator 152 and the sound indications from indicator 160, hydrostatic testing can commence with pressure on one side of the ice plug ($P_H$) being raised slowly to test its integrity (see FIGS. 2, 6). If the back side pressure ($P_L$) does not increase as additional water is pumped into the test section 16T, this indicates that the ice plug is solidly frozen. Additional water is then pumped into the test section 16T until the desired test pressure is achieved therein. The test pressure for above ground piping, such as the launcher-receiver 18, and the discharge plumbing associated with the station 12 will typically be from 2000 PSI to 2800 PSI which is somewhat higher than the normal test pressures for the buried portions of the line 16.

After the test pressure is achieved, it is maintained for a prolonged period, typically 24 hours. Any variation in pressure whatsoever not attributable to changes in temperature indicates a leak. Any rise in the pressure $P_L$ coupled with a loss of pressure in the test section indicates that the ice plug has slipped along the line or that the ice plug has leaked. A loss of pressure on the back side not coupled with the loss of pressure on the test side indicates that a leak has occurred between the ice plug 52P and the main line valve 23. In the event of a leak, the leak must be found, repaired, and a successful test completed before proceeding to the next test section.

After a successful test, the plug 52P is allowed to thaw and the slug of water 52 is advanced to another position along the line for further testing. Thawing of the ice plug 52 is facilitated by opening a drain valve 130 in the lower half 66 of the envelope 62 to allow the liquid nitrogen to drain rapidly from the chamber 70.

A diary of events associated with a typical freeze accomplished by the method and apparatus of the present invention is shown in the following table:

FREEZE DATA
LOCATION: Benjamin Station
PIPE: 10" (Test and Upgrade)
PURPOSE: Isolate 10 Mile Section for Testing

| TIME | PIPE TEMP. | AMBIENT AIR TEMP. | REMARKS |
|---|---|---|---|
| 11:10 A.M. | +82 | 82 | Liquid Nitrogen On, Vapor Off |
| 11:15 | +20 | 82 | Freezing Sounds Started |
| 11:20 | −57 | 82 | |
| 11:25 | −66 | 80 | |
| 11:30 | −107 | 80 | |
| 11:35 | −110 | 80 | |
| 11:40 | −125 | 80 | Freezing Sounds Strong |
| 11:45 | −135 | 82 | |
| 11:50 | −140 | 82 | |
| 11:55 | −177 | 82 | Sound Sporadic |
| 12:00 P.M. | −180 | 82 | Box Full, Liquid Nitrogen Off |
| 12:05 | −125 | 82 | Vapor Only |
| 12:10 | −130 | 82 | Liquid Nitrogen On - Vapor Off |
| 12:15 | −185 | 82 | |
| 12:20 | −225 | 83 | Liquid Nitrogen On - Vapor On |
| 12:25 | −240 | 83 | |
| 12:30 | −250 | 84 | Freezing Sound Constant |
| 12:35 | −260 | 84 | |
| 12:40 | −285 | 84 | |
| 12:45 | −290 | 84 | |
| 12:50 | −295 | 84 | |
| 12:55 | −303 | 84 | Regulating Temp. about −300° |
| 1:00 | −307 | 84 | Liquid Nitrogen Off - Vapor On |
| 1:05 | −310 | 84 | Freezing Sounds Diminishing |
| 1:10 | −310 | 84 | |
| 1:15 | −305 | 84 | Nitrogen On - Vapor Off |
| 1:20 | −276 | 84 | Plug Frozen - Liquid Off - Vapor On |
| 1:25 | −230 | 85 | Out of Nitrogen |
| 1:30 | −215 | 85 | |
| 1:35 | −203 | 85 | Vapor Off |
| 1:40 | −220 | 85 | |
| 1:45 | −220 | 85 | Started New Tank of Nitrogen, Liquid On |
| 1:50 | −265 | 86 | |
| 2:00 | −300 | 86 | Liquid Nitrogen Off, Vapor Off |
| 2:05 | −305 | 87 | |
| 2:10 | −305 | 87 | |
| 2:20 | −310 | 87 | |
| 2:30 | −300 | 87 | |
| 2:45 | | | Removed Nitrogen Box, Installed Holding Box. Ready for Pressure Test |

From the foregoing description of preferred embodiments of the invention, those skilled in the art will appreciate that the method and apparatus of the present invention provides an ice plug much faster and with more confidence than previous arrangements. Because the governing mechanism in the heat transfer process is by convective heat transfer from the surface of the pipeline directly to liquid cryogenic cooling fluid rather than by conduction through an intermediate body, the ice plug is formed much more rapidly and is sustained during the hydrostatic testing, repair or modification procedures with less effort as compared with prior art arrangements. p Although preferred embodiments of the invention have been described in detail, it should be understood that various changes, substitutions, and alterations can be made therein without departing from the spirit and scope of the invention as defined by the appended claims.

What is claimed is:

1. A method of freezing a slug of liquid in a section of fluid transmission line by the transfer of thermal energy from the slug of liquid through the transmission line to a pool of liquid cooling fluid which evaporates when exposed to a predetermined range of pressure and temperature conditions comprising:

enclosing the section of transmission line with thermally insulated material to define an insulated chamber around the section;

discharging liquid cooling fluid into the chamber until the chamber is at least partially filled by the liquid and at least a portion of the enclosed transmission line is submerged in a pool of the liquid cooling fluid, said step being terminated thereafter during a predetermined interval while the liquid cooling fluid evaporates in response to the transfer of heat from the transmission line, said step being repeated thereafter to replenish the evaporated cooling fluid;

sensing the temperature of the surface of the enclosed transmission line as the chamber is filled;

said step of discharging liquid cooling fluid into the chamber being repeated to replenish the evaporated cooling fluid in response to an increase in temperature of the transmission line to a predetermined level as indicated by the temperature sensing step;

agitating the liquid in the pool;

exhausting cooling fluid vapor from the chamber; and sensing the rate of formation of crystals within the slug of liquid as it freezes.

2. The method as defined in claim 1 wherein said rate sensing step is performed by detecting the amplitude of the noise generated within the slug by the movement of crystals as the slug freezes.

3. The method as defined in claim 1 wherein said rate sensing step is performed by detecting the frequency of the noise generated within the slug by the movement of crystals as the slug freezes.

4. The method as defined in claim 1 further including: discharging cooling fluid vapor into the chamber for a predetermined period prior to said step of discharging liquid cooling fluid into the chamber.

5. The method as defined in claim 4 wherein said step of discharging cooling fluid vapor into the chamber is continued during the performance of said step of discharging liquid cooling fluid into the chamber.

6. A method of freezing a slug of liquid in a section of a fluid transmission line by the transfer of thermal energy from the slug of liquid through the transmission line to a pool of liquid cooling fluid which evaporates when exposed to a predetermined range of pressure and temperature conditions comprising:

enclosing the section of transmission line with thermally insulated material to define an insulated chamber around the section;

discharging liquid cooling fluid into the chamber until at least a portion of the enclosed transmission line is submerged in a pool of the liquid cooling fluid;

agitating the liquid in the pool by discharging a stream of cooling fluid vapor through the pool; and exhausting cooling fluid vapor from the chamber.

7. The method as defined in claim 6 further comprising:

discharging a stream of cooling fluid vapor onto the enclosed surface of the transmission line simultaneously with the flow of cooling fluid vapor through the pool.

8. A method of freezing a slug of liquid in a section of a fluid transmission line by the transfer of thermal energy from the slug of liquid through the transmission line to a pool of liquid cooling fluid which evaporates when exposed to a predetermined range of pressure and temperature conditions comprising:

enclosing the section of transmission line with thermally insulated material to define an insulated chamber around the section;

discharging liquid cooling fluid into the chamber until at least a portion of the enclosed transmission line is submerged in a pool of the liquid cooling fluid;

agitating the liquid in the pool by the buoyant movement through the pool of bubbles of cooling fluid vapor which are produced in response to heat transferred from the submerged portions of the transmission line to the surrounding liquid; and exhausting cooling fluid vapor from the chamber.

9. A method of freezing a slug of liquid in a section of a fluid transmission line by the transfer of thermal energy from the slug of liquid through the transmission line to a pool of liquid cooling fluid which evaporates when exposed to a predetermined range of pressure and temperature conditions comprising:

enclosing the section of transmission line with thermally insulated material to define an insulated chamber around the section;

discharging liquid cooling fluid into the chamber until at least a portion of the enclosed transmission line is submerged in a pool of the liquid cooling fluid;

agitating the liquid in the pool by the buoyant movement through the pool of bubbles of cooling fluid vapor which are produced in response to heat transferred from the submerged portions of the transmission line at structural irregularities in the suface of a permeable medium disposed on the submerged portion of the transmission line; and exhausting cooling fluid vapor from the chamber.

10. A method of freezing a slug of liquid in a section of a fluid transmission line by the transfer of thermal energy from the slug of liquid through the transmission line to a pool of liquid cooling fluid which evaporates when exposed to a predetermined range of pressure and temperature conditions comprising:

enclosing the section of transmission line with a detachable shell of thermally insulated material to define an insulated chamber around the section, the insulating material including a shroud covering the union of each end of the shell and the portions of the transmission line extending beyond the section;

discharging liquid cooling fluid into the chamber until at least a portion of the enclosed transmission line is submerged in a pool of the liquid cooling fluid;

agitating the liquid in the pool;

exhausting cooling fluid vapor from the chamber; and discharging the cooling fluid vapor exhausted from the chamber onto the thermally insulating material, said discharging step being performed by exhausting the cooling fluid vapor through a manifold connected in fluid communication with the chamber, the manifold having a plurality of conduits through which the cooling fluid vapor is discharged onto the shroud at each end of the section.

* * * * *